United States Patent [19]
Conti

[11] Patent Number: 5,829,102
[45] Date of Patent: Nov. 3, 1998

[54] HOUSING ASSEMBLY WITH A DETACHABLE MOUNTING CLIP AND A SELECTIVE CALL RECEIVER THEREIN

[75] Inventor: Brian V. Conti, Lake Worth, Fla.

[73] Assignee: Motorola, Inc., Schaumburg, Ill.

[21] Appl. No.: 954,114

[22] Filed: Oct. 20, 1997

[51] Int. Cl.⁶ .................................................. A45F 5/00
[52] U.S. Cl. .............................. 24/3.12; 24/3.1; 24/3.5; 24/3.11
[58] Field of Search ................................ 24/3.1, 3.5, 3.7, 24/3.11, 3.12; 224/272, 929

[56] References Cited

U.S. PATENT DOCUMENTS

| | | |
|---|---|---|
| 4,083,481 | 4/1978 | Selinko . |
| 4,741,074 | 5/1988 | Budano, II et al. ...................... 24/3.11 |
| 4,956,895 | 9/1990 | Hayasaka .................................. 24/3.11 |
| 5,488,759 | 2/1996 | Lim et al. ................................ 24/3.12 |
| 5,664,292 | 9/1997 | Chen ........................................ 24/3.11 |

*Primary Examiner*—Victor N. Sakran
*Attorney, Agent, or Firm*—Eduardo Guntin

[57] ABSTRACT

A housing assembly (100) includes a housing having a selective call receiver (200) therein, a raised ridge (108) coupled to the housing, the raised ridge having under cut side walls (115, 117) forming a tapered recess (114) open at one end. Additionally, the housing assembly includes a latch (106) coupled to the housing, the latch centered about the under cut side walls and having a detent (110) at an end opposite to the raised ridge. An elongated mounting clip (120) coupled to a base plate (118) is used for engagement with the housing. To accomplish this, the base plate is dimensioned to insert within the under cut side walls of the raised ridge and to engage with the detent for latching the elongated mounting clip to the housing.

8 Claims, 5 Drawing Sheets

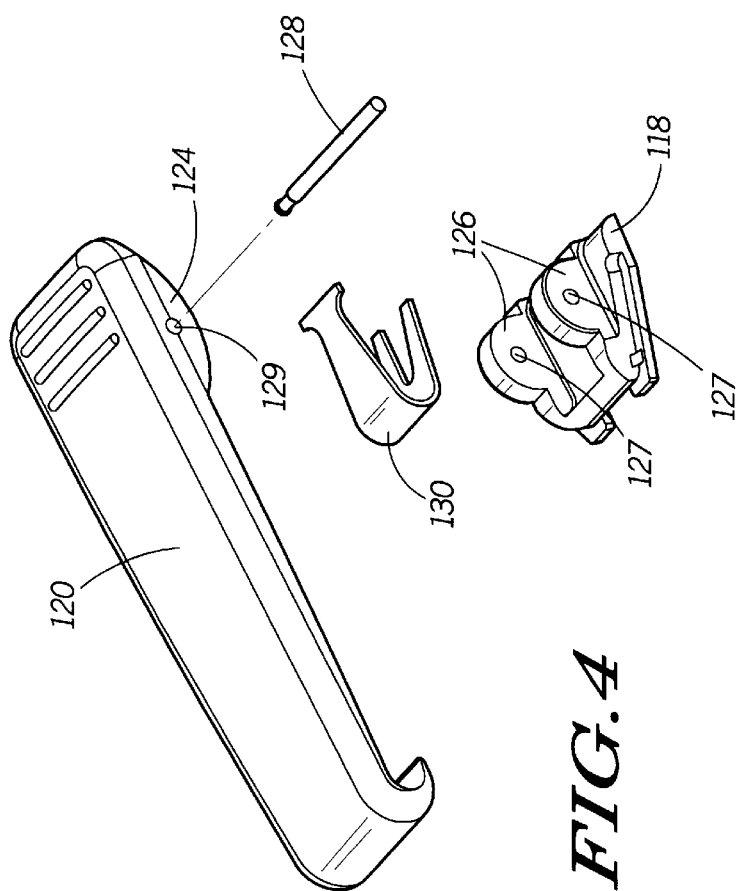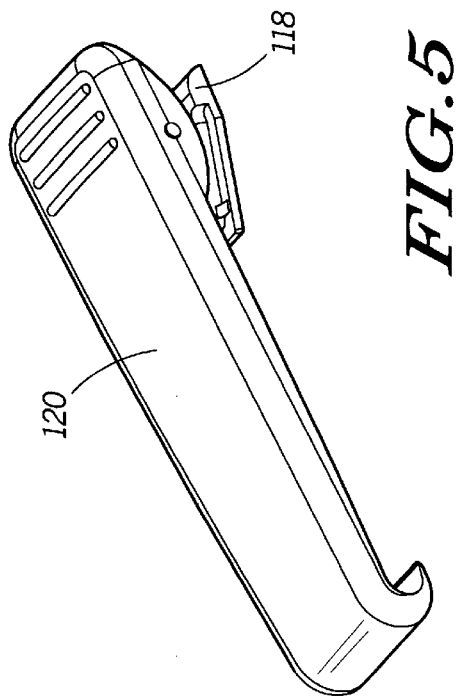

5,829,102

HOUSING ASSEMBLY WITH A DETACHABLE MOUNTING CLIP AND A SELECTIVE CALL RECEIVER THEREIN

FIELD OF THE INVENTION

This invention relates in general to a housing assembly, and particularly, to a housing assembly with a detachable mounting clip and a selective call receiver therein.

BACKGROUND OF THE INVENTION

Numerous PCD's (portable communication devices) use a mounting clip as an accessory for allowing consumers to attach the PCD to his or her clothing attire (e.g., a belt). As with many consumer products, ease of manufacturability and serviceability of PCD's have a direct correlation on cost. An important aspect of manufacturability is the ease of assembly of the mounting clip to the housing of a PCD. The more components needed for assembly of the mounting clip to the housing (e.g., screws, spring, etc.) the slower the manufacturing process and the more likely that manufacturing defects will occur.

Although mounting clips are well known, they have not been entirely satisfactory. In some cases, mounting clips have been objectionably large requiring a number of parts resulting in excess manufacturing costs and complexity in assembly. Accordingly, what is needed is a housing assembly of a PCD that overcomes the foregoing disadvantages described in the prior art.

BRIEF DESCRIPTION OF THE DRAWINGS

The present invention is pointed out with particularity in the appended claims. However, other features of the invention will become more apparent and best understood by referring to the following detailed description in conjunction with the accompanying drawings in which:

FIG. 4 shows an assembly of the elongated mounting clip and a base plate coupled to a pivoting mechanism according to the present invention;

FIG. 5 shows a perspective view of the elongated mounting clip and the base plate after assembly with the pivoting mechanism, while

DESCRIPTION OF THE PREFERRED EMBODIMENT

Figure 1:
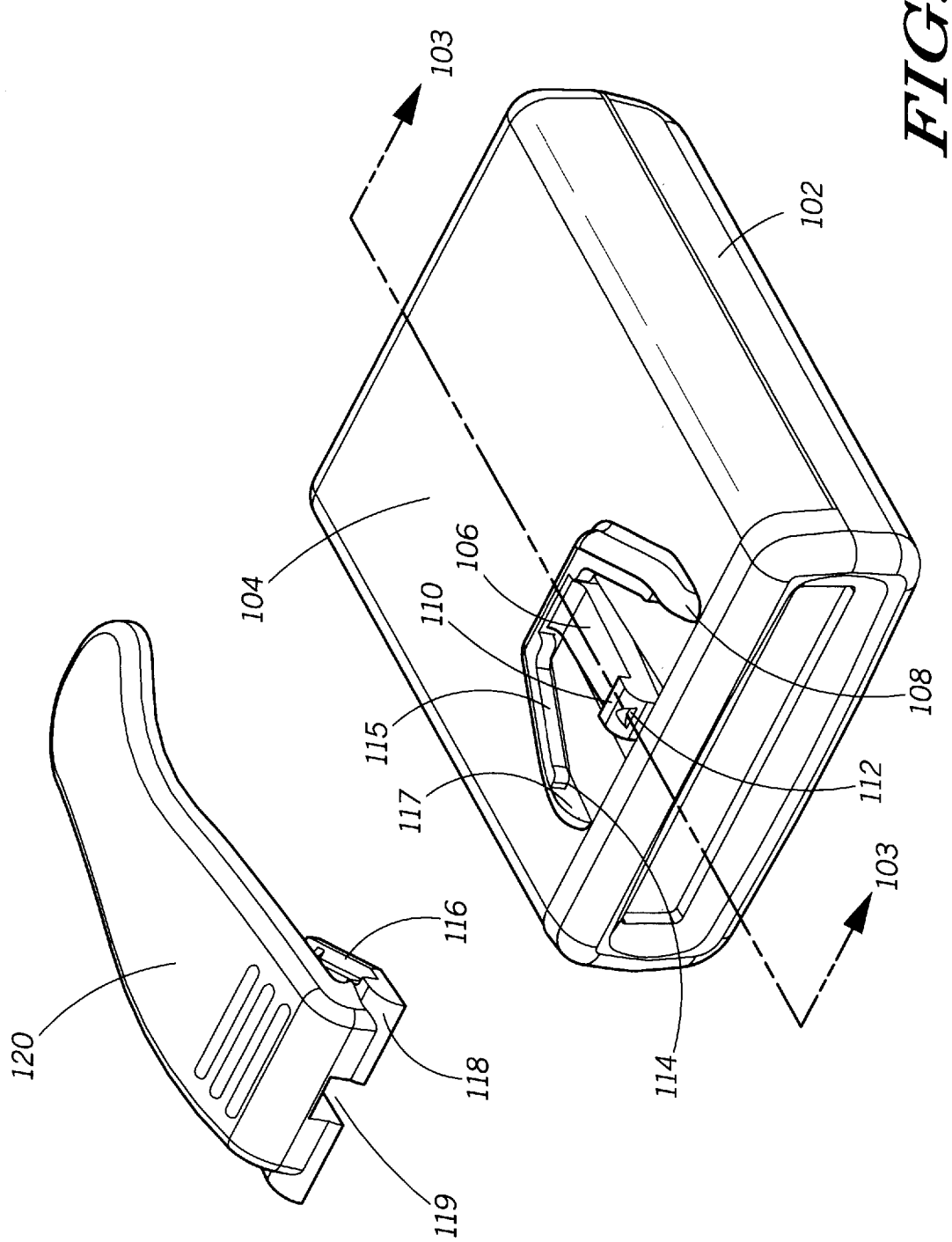
FIG. 1 shows a perspective view of a housing assembly including a housing and an elongated mounting clip constructed according to the present invention.

FIG. 1 shows a perspective view of a housing assembly 100 including a housing and an elongated mounting clip 120 constructed according to the present invention. The housing comprises front and back covers 102, 104. The back cover 104 includes a raised ridge 108 that is contiguous with the back cover 104, and that has under cut side walls 115, 117 forming a tapered recess 114 open at one end. Additionally, the back cover 104 includes a latch 106 coupled thereto. The latch 106 is centered about the under cut side walls 115, 117 and has a detent 110 at an end opposite to the raised ridge 108 for interlocking the elongated mounting clip 120 to the back cover 104. At an edge of the detent 110, the latch 106 includes a recess 112 for depression of the latch 106 to assist in removing the elongated mounting clip 120 from the back cover 104.

Figure 2:
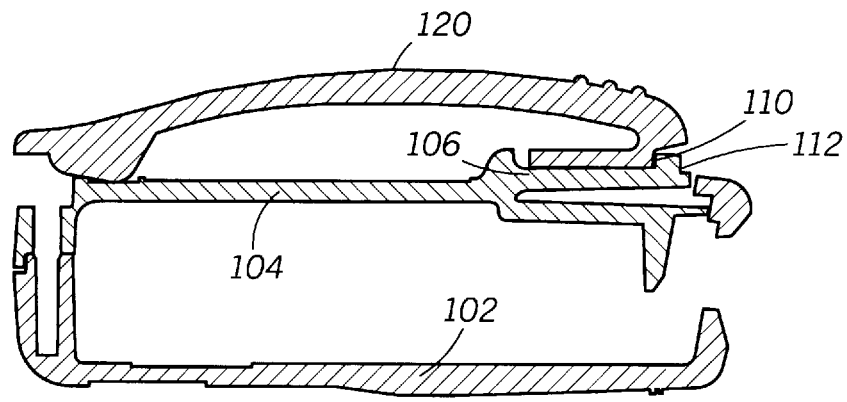
FIGS. 2 and 3 show a cross-sectional and perspective view, respectively, of the housing after it has been assembled according to the present invention.
Figure 3:
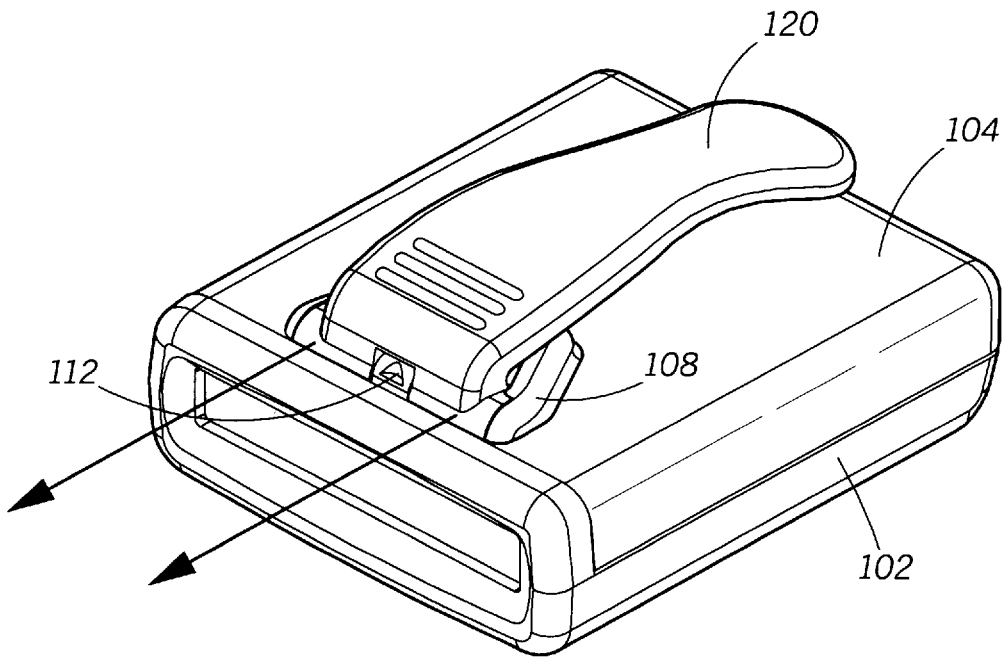

In a first embodiment, the elongated mounting clip 120 is coupled to a base plate 118 that is contiguous therewith. The base plate 118 is dimensioned for insertion within the under cut side walls 115, 117 of the raised ridge 108 for engagement with the detent 110 for latching the elongated mounting clip 120 to the back cover 104. Additionally, the base plate 118 includes beveled edges 116 for inserting within the under cut side walls 115, 117 and a guide channel 119 to guide the base plate 118 with the latch 106 during insertion. FIGS. 2 and 3 show a cross-sectional and perspective view 103, respectively, of the housing after it has been assembled according to the present invention. As should be evident from the cross-sectional view 103, once the latch 106 has engaged with the base plate 118, the detent 110 of the latch 106 interlocks the base plate 118 with the raised ridge 108 of the back cover 104. To remove the elongated mounting clip 120 from the back cover 104, the recess 112 is depressed while simultaneously pulling the elongated mounting clip 120 away from the raised ridge 108 (as indicated by the directional arrows).

FIG. 4 shows an alternative embodiment of the assembly of the elongated mounting clip 120 and the base plate 118 according to the present invention. Under this embodiment, the elongated mounting clip 120 and the base plate 118 are coupled to a pivoting mechanism. The pivoting mechanism comprises a plurality of upstanding projections 126 on the base plate 118 with a central opening 127 therein, a corresponding plurality of upstanding projections 124 on the elongated mounting clip 120 having similar openings 129 therein. Although not shown, the elongated mounting clip 120 also includes an additional projection 124 and corresponding opening 129 at an edge opposite and parallel to the edge of the upstanding projection 124 shown. The locking mechanism includes a lock pin 128 insertable in the openings 127, 129 of the projections 126, 124 of the base plate 118 and the elongated mounting clip 120, respectively. Additionally, a torsion spring 130 is mounted on the lock pin 128 to provide a set spring bias for the elongated mounting clip 120.

Figure 6:
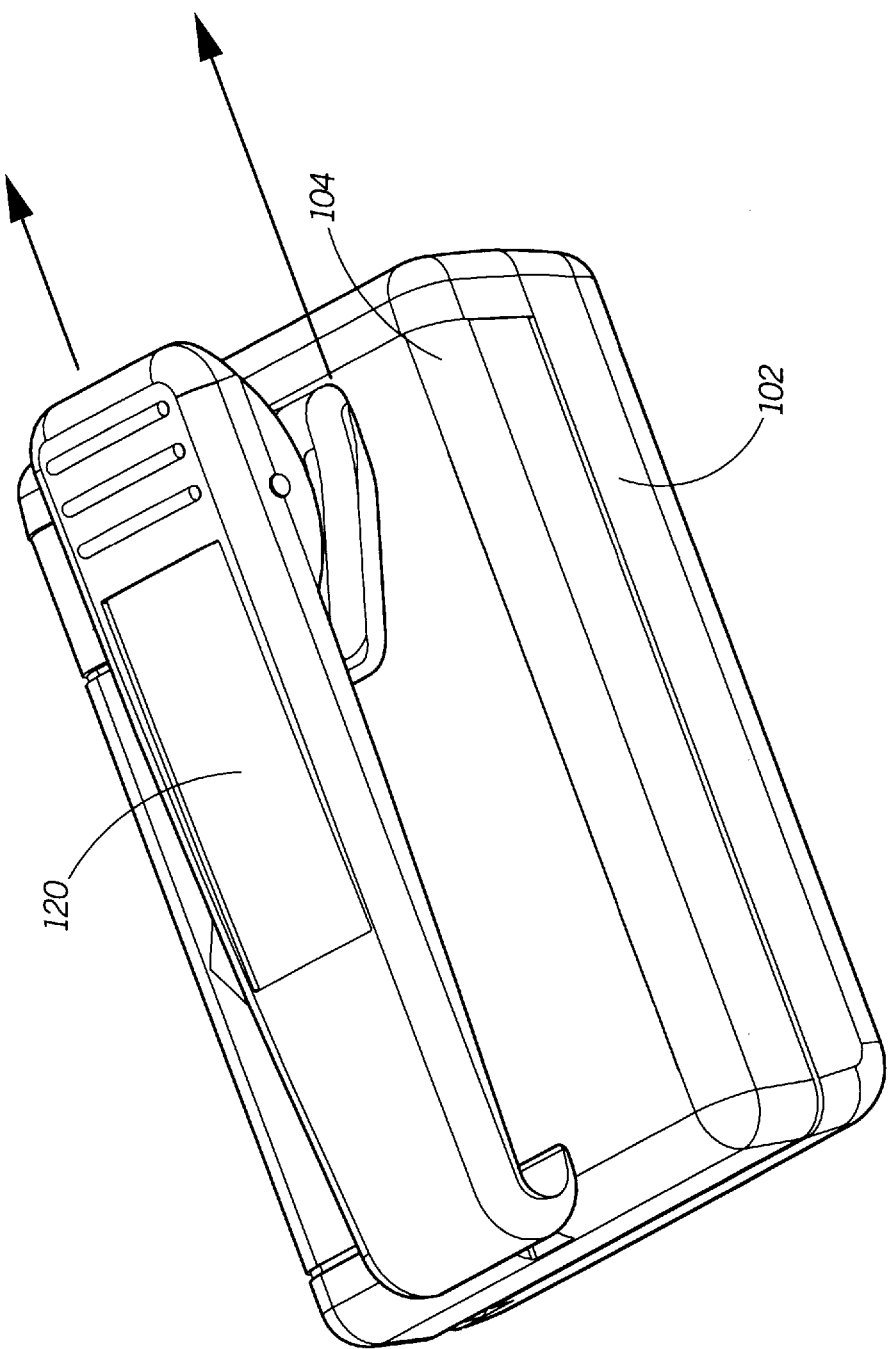
FIG. 6 shows assembly of the same with the housing according to the present invention.

As in the first embodiment, the base plate 118 is dimensioned for insertion within the under cut side walls 115, 117 of the raised ridge 108 for engagement with the detent 110 of the latch 106. FIG. 5 shows a perspective view of the elongated mounting clip 120 and the base plate 118 after assembly with the pivoting mechanism, while FIG. 6 shows the same after assembly with the housing according to the present invention.

In many respects the embodiments just described are advantageous over the prior art. For example, in the first embodiment the raised ridge 108, and the latch 106 are contiguous portions of the back cover 104. Similarly, the base plate 118 is contiguous with the elongated mounting clip 120. Consequently, only two assembly parts are necessary for assembly of the housing, thereby providing ease of manufacturability, which in turn reduces cost to the end consumer. Additionally, with the addition of the recess 112 to the latch 106, removal of the elongated mounting clip 120 from the back cover 104 is made easy, thereby improving serviceability of the housing assembly 100. Although more parts are necessary in the second embodiment of the elongated mounting clip 120 and the base plate 118, the number of extra components is minimal. More importantly, the interlocking strategy between the base plate 118 and the raised ridge 108 of the back cover 104 is essentially the same, thereby maintaining the benefits of the first embodiment.

Figure 7:
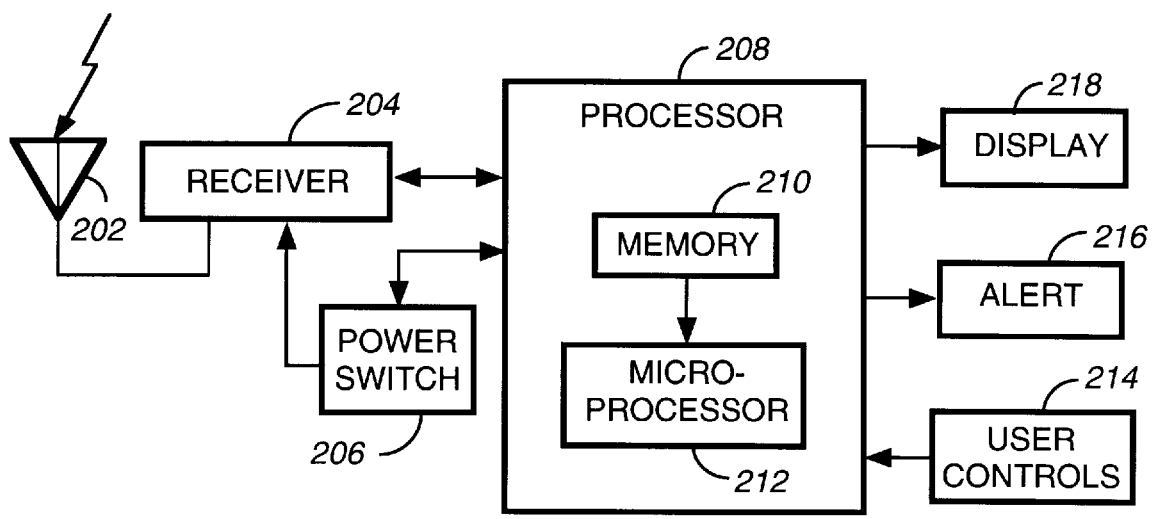
FIG. 7 shows an electrical block diagram of a selective call receiver included in the housing of FIG. 1 according to the present invention.

FIG. 7 shows an electrical block diagram of a SCR (selective call receiver) 200 included in the housing of FIG. 1 according to the present invention. The SCR 200 comprises an antenna 202 for intercepting RF signals from, for example, a radio communication system (not shown). The antenna 202 is coupled to a receiver 204 employing conventional demodulation techniques for receiving the communication signals transmitted by the radio communication system. Radio signals received by the receiver 204 produce demodulated information, which is coupled to a processor 208 for processing received messages. A conventional power switch 206, coupled to the processor 208, is used to control the supply of power to the receiver 204, thereby providing a battery saving function.

To perform the necessary functions of the SCR 200, the processor 208 includes a microprocessor 212, and a memory 210 including a random access memory (RAM), a read-only memory (ROM), and an electrically erasable programmable read-only memory (EEPROM). Preferably, the processor 208 is similar to the M68HC08 micro-controller manufactured by Motorola, Inc. It will be appreciated that other similar processors can be utilized for the processor 208, and that additional processors of the same or alternative type can be added as required to handle the processing requirements of the processor 208.

The processor 208 is programmed by way of the ROM to process incoming messages transmitted by the radio communication system. The processor 208 decodes an address in the demodulated data of the received message, compares the decoded address with one or more addresses stored in the EEPROM, and when a match is detected, proceeds to process the remaining portion of the message. Once the processor 208 has processed the message, it stores the message in the RAM, and a call alerting signal is generated to alert a user that a message has been received. The call alerting signal is directed to a conventional audible or tactile alerting device 216 for generating an audible or tactile call alerting signal.

The message can be accessed by the user through user controls 214, which provide functions such as lock, unlock, delete, read, etc. More specifically, by the use of appropriate functions provided by the user controls 214, the message is recovered from the RAM, and conveyed to the user by way of a display 218, e.g., a conventional liquid crystal display (LCD). It will be appreciated that, alternatively, the display 218 can be accompanied by an audio circuit (not shown) for conveying voice messages.

Although the invention has been described in terms of a preferred embodiment it will be obvious to those skilled in the art that many alterations and variations may be made without departing from the invention. Accordingly, it is intended that all such alterations and variations be considered as within the spirit and scope of the invention as defined by the appended claims.

What is claimed is:

1. A housing assembly, comprising:
   a housing;
   a raised ridge contiguous with the housing, the raised ridge having under cut side walls forming a tapered recess open at one end;
   a latch contiguous with the housing, the latch centered about the under cut side walls and having a detent at an end opposite to the raised ridge;
   an elongated mounting clip; and
   a base plate contiguous with the elongated mounting clip, wherein the base plate further comprises beveled edges for inserting within the under cut side walls, and a guide channel to guide the base plate with the latch during insertion, and
   wherein the base plate is dimensioned to insert within the under cut side walls of the raised ridge and to engage with the detent for latching the elongated mounting clip to the housing.

2. The housing assembly as recited in claim 1, wherein the latch further includes a recess at an edge of the detent for depression of the latch to assist in removing the elongated mounting clip from the housing.

3. The housing assembly as recited in claim 1, wherein the elongated mounting clip and the base plate are coupled to a pivoting mechanism.

4. The housing assembly as recited in claim 3, wherein the pivoting mechanism comprises:
   a plurality of upstanding projections on the base plate with a central opening therein;
   a corresponding plurality of upstanding projections on the elongated mounting clip having similar openings therein; and
   a lock pin insertable in the opening of the projections of the base plate and the elongated mounting clip.

5. The housing assembly as recited in claim 4, wherein the pivoting mechanism further comprises a torsion spring mounted on the lock pin to provide a set spring bias for the elongated mounting clip.

6. The housing assembly as recited in claim 1, wherein the housing comprises a selective call receiver.

7. A housing assembly, comprising:
   a housing;
   a raised ridge coupled to the housing, the raised ridge having under cut side walls forming a tapered recess open at one end;
   a latch coupled to the housing, the latch centered about the under cut side walls and having a detent at an end opposite to the raised ridge;
   an elongated mounting clip;
   a base plate coupled to the elongated mounting clip, the base plate dimensioned to insert within the under cut side walls of the raised ridge and to engage with the detent for latching the elongated mounting clip to the housing; and
   a pivoting mechanism coupled to the base plate and the elongated mounting clip, wherein the pivoting mechanism comprises:
   a plurality of upstanding projections on the base plate with a central opening therein,
   a corresponding plurality of upstanding projections on the elongated mounting clip having similar openings therein,
   a lock pin insertable in the opening of the projections of the base plate and the elongated mounting clip, and
   a torsion spring mounted on the lock pin to provide a set spring bias for the elongated mounting clip.

8. The housing assembly as recited in claim 7, wherein the housing comprises a selective call receiver.

* * * * *